(12) United States Patent
Hoffmann

(10) Patent No.: US 12,128,804 B2
(45) Date of Patent: Oct. 29, 2024

(54) SUPPORT ROD, SUPPORT DEVICE AND METHOD OF MANUFACTURE

(71) Applicant: GRAMMER AG, Ursensollen (DE)

(72) Inventor: Markus Hoffmann, Kümmersbruck (DE)

(73) Assignee: GRAMMER AG, Ursensollen (DE)

( * ) Notice: Subject to any disclaimer, the term of this patent is extended or adjusted under 35 U.S.C. 154(b) by 451 days.

(21) Appl. No.: 17/536,677

(22) Filed: Feb. 8, 2022

(65) Prior Publication Data
US 2022/0169162 A1    Jun. 2, 2022

(51) Int. Cl.
*B60N 2/818* (2018.01)
*B60N 2/809* (2018.01)
*B60N 2/812* (2018.01)
*B60N 2/897* (2018.01)

(52) U.S. Cl.
CPC .................. *B60N 2/812* (2018.02)

(58) Field of Classification Search
CPC .......... B60N 2/80; B60N 2/818; B60N 2/897; B60N 2/809; B60N 2/812
See application file for complete search history.

(56) References Cited

U.S. PATENT DOCUMENTS

| | | | |
|---|---|---|---|
| 4,191,423 A * | 3/1980 | Goldner | B60N 2/838 297/410 |
| 4,854,642 A | 8/1989 | Vidwans | |
| 6,062,645 A * | 5/2000 | Russell | B60N 2/818 297/410 |
| 6,802,565 B2 * | 10/2004 | Isaacson | B60N 2/818 297/410 |
| 9,132,470 B2 | 9/2015 | Pausch | |
| 9,821,693 B2 | 11/2017 | Hagan | |
| 10,029,596 B2 | 7/2018 | Segura | |
| 10,391,908 B2 | 8/2019 | Hans | |
| 11,945,353 B2 * | 4/2024 | Schmitt | B60N 2/809 |

(Continued)

FOREIGN PATENT DOCUMENTS

| | | |
|---|---|---|
| CN | 101676145 A | 3/2010 |
| CN | 105452056 A | 3/2016 |

(Continued)

OTHER PUBLICATIONS

Annex of the European search report dated Apr. 14, 2022, 1 page.
Annex of the Chinese search report dated Apr. 26, 2023, 1 page.

*Primary Examiner* — Shin H Kim
(74) *Attorney, Agent, or Firm* — LUCAS & MERCANTI, LLP; Klaus P. Stoffel

(57) ABSTRACT

A support rod for a vehicle seat head restraint, which is formed as a tube, having at least one structure as part of a locking device and intended for cooperating with a catch of the locking device which is associated with a holding structure. The structure has a base surface which prevents movement of the catch radially to a central axis of the support rod and includes a catch surface that prevents, together with the catch, movement of the support rod in a first direction. At least one catch structure as a detent structure has a cut-out tongue. An inner surface of the tongue radially facing a central axis of the support rod at a free end being spaced apart from the base surface by a height so that the catch is movable at least with a partial region radially under a region of the inner surface of the tongue.

13 Claims, 5 Drawing Sheets

(56) References Cited

U.S. PATENT DOCUMENTS

| | | | |
|---|---|---|---|
| 2006/0061188 A1* | 3/2006 | Locke | B60N 2/815 |
| | | | 297/410 |
| 2006/0214492 A1* | 9/2006 | Hassler | B60N 2/815 |
| | | | 297/410 |
| 2010/0194167 A1* | 8/2010 | Gans | B60N 2/818 |
| | | | 297/410 |
| 2012/0148342 A1* | 6/2012 | Wanke | B60N 2/809 |
| | | | 403/361 |
| 2015/0001908 A1* | 1/2015 | Hagan | F16C 33/1095 |
| | | | 297/410 |
| 2015/0251577 A1* | 9/2015 | Ishihara | B60N 2/888 |
| | | | 297/216.12 |
| 2015/0329022 A1 | 11/2015 | Miyaguchi | |
| 2017/0088024 A1* | 3/2017 | Hans | B60N 2/809 |
| 2023/0031120 A1* | 2/2023 | Schmitt | B60N 2/888 |
| 2023/0035161 A1* | 2/2023 | Schmitt | B60N 2/897 |
| 2023/0104605 A1* | 4/2023 | Schmitt | B60N 2/882 |
| | | | 297/391 |

FOREIGN PATENT DOCUMENTS

| | | |
|---|---|---|
| CN | 106414166 A | 2/2017 |
| CN | 106553571 A1 | 4/2017 |
| DE | 102008047531 B3 | 9/2009 |
| DE | 102010045614 A1 | 3/2012 |
| DE | 102010064068 A1 | 6/2012 |
| DE | 102018113515 A1 | 12/2019 |
| EP | 3733449 A1 | 11/2020 |
| JP | 2005212653 A | 8/2005 |

\* cited by examiner

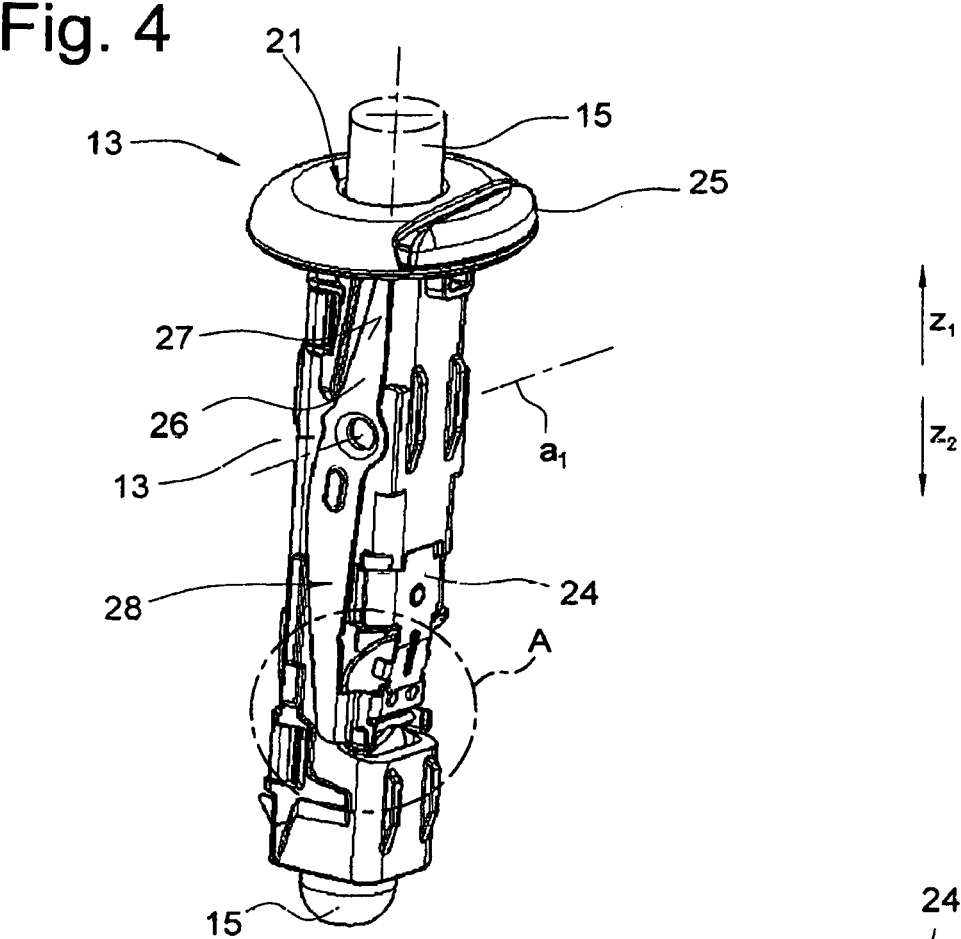
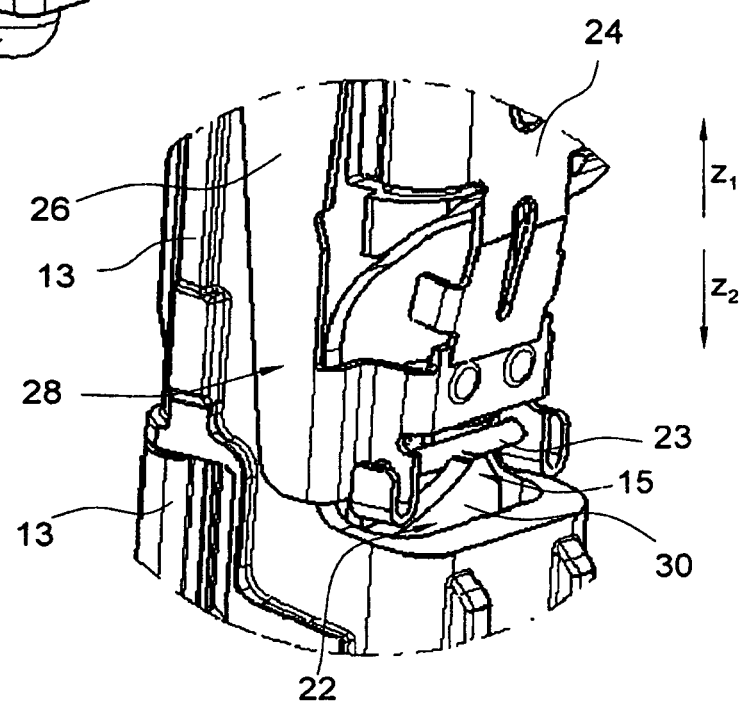

SUPPORT ROD, SUPPORT DEVICE AND METHOD OF MANUFACTURE

CROSS-REFERENCE TO RELATED APPLICATIONS

The present application which claims priority of DE 10 2020 131 548.1, filed Nov. 27, 2020, the priority of the application is hereby claimed and this application is incorporated herein by reference.

BACKGROUND OF THE INVENTION

The invention relates first of all to a support rod for a head restraint of a vehicle seat. A support rod of this type in the context of the invention is an individual support rod or a free end of a support rod bracket.

From prior public use, support rods are known which have a first end region for fastening to a headrest part and a second end region, located opposite the first end region, for fastening to a vehicle seat. The support rod is formed in such a way that it can be held in a holding structure, mounted on the vehicle seat, of a holding device. It has at least one detent structure which prevents unwanted movement of the support rod out of the holding device. This detent structure usually had at least one catch surface which cooperated with a catch of the holding device. The catch surface was formed in such a way that if the catch and the catch surface cooperated it prevented any movement of the support rod in the dismantling direction out of the holding device.

DE 10 2010 045 614 A1 was concerned with the problem of guaranteeing the engagement of a catch of the guidance structure with a notch of the support rod even upon twisting of the support rod relative to the guide structure.

SUMMARY OF THE INVENTION

The object of the invention was to prevent the unwanted movement of the support rod out of the guide structure also with regard to an above-mentioned detent structure upon twisting of the support rod, e.g. in the event of a vehicle impact.

The term "vehicle" in the context of this invention designates a land vehicle, aircraft or water-borne vehicle. The support rod is formed as a tube. It has a detent structure which is part of a locking device. The detent structure is intended for cooperating with a catch of the locking device, with which a holding device of the support rod is associated, in such a way that any movement of the support rod in at least one direction is prevented if the catch is in engagement with the recess.

The so-called detent structure prevents dismantling of the support rod out of a holding structure of a holding device in which the support rod is held. The detent structure has a base surface which limits any movement of the catch radially to a central axis of the support rod. The detent structure is provided with a cut-out tongue. The term "cut-out" in the context of the invention means that a region of the support rod material no longer has any contact with the adjacent region, in such a way that an approximately U-shaped gap is present which forms a free end region, which is referred to in this application as a "tongue". The free end region is furthermore connected to the support rod by a connection region. Owing to the cut-out tongue, it is possible e.g. to emboss a further base surface, as a result of which greater security against releasing of the catch can be achieved if the support rod is twisted.

When producing the base surface, by pressing in the outer surface of the support rod by means of a pressing punch approximately at right-angles to a central axis of the support rod, the gap can be produced e.g. by embossing, in that the material is sheared off with an embossing tool. Alternatively, a wall between the base surface and the outer surface forming due to the flowing metallic material of the support rod can be removed, e.g. by metal cutting. This produces the tongue and, within the tongue, directed towards a central axis of the support rod, an opening.

An inner surface of the tongue which faces the central axis, at a free end of the tongue, is spaced apart from a reveal of the opening produced owing to the cutting-out with a defined height, so that the catch, at least with a partial region, can be arranged radially within the inner surface of the tongue. In other words, the catch is arranged between the inner surface and the base surface.

An edge surface of the tongue extends e.g. between the base surface and a free end region of the tongue. This edge surface forms the catch surface which can prevent the approximately radial movement of a catch out of the holding structure and also can prevent any movement of the support rod in a first longitudinal direction parallel to the central axis of the support rod if the catch surface is in engagement with a catch. The edge surface, e.g. in a top view of the tongue approximately at right-angles to a central axis of the support rod, runs approximately in a U-shape or in a V-shape.

The tongue forms e.g. two edge surfaces which run towards one another, which meet at the free end region. Each edge surface forms, e.g. with a central axis of the free end region, an angle of between 30° and 65°, e.g. between 30° and 60°, in particular an angle of between 40° and 50°. For example, each edge surface extends at an angle of 45 degrees to the central axis. With an angle of between 60° and 65°, beneficial manufacturing properties and nevertheless a high frictional force, which any movement of the catch out of engagement with the detent structure, result. The friction of the catch on the edge surfaces of the tongue prevents the catch from unintentionally moving out of engagement with the detent structure.

Because of the cutting-out or the embossing-out of the material of the cutout, the catch has the possibility of moving further in the direction of the connection region of the tongue, so that there is engagement with the tongue which prevents unwanted unlocking with greater security in relation to the prior art.

The two edge surfaces may form e.g. a tip. Alternatively, the edge surfaces meet at a transitional surface which is arranged at right-angles to the central axis of the support rod. In the event that the edge surfaces run towards one another, the base surface, on a reveal of the opening in the region of the tongue, has e.g. a concave complementary form to that of the tongue.

The tongue lies e.g. opposite a catch surface which is formed in such a way that in cooperation with the catch it can prevent any movement of the support rod in a second direction.

In the direction of the longitudinal axis of the support rod, e.g. a slope structure which drops from an outer surface of the support rod across a longitudinal region of the central axis onto the base surface lies opposite the detent structure. This gentle drop prevents cracking during production of the support rod and thus permits production of a base surface which is deep with respect to the outer surface. The slope structure may have a catch surface in a region facing the outer surface of the support rod.

The base surface extends e.g. in the direction parallel to the central axis of the support rod on both sides of the slope structure across a longitudinal region of the support rod. With this feature, the width of the catch surface is limited, which in the case of support rods which are circularly cylindrical in cross-section prevents unwanted unlocking upon twisting of the support rod. Reference is made to the disclosure of DE 10 2008 047 531 A1 and also DE 10 2010 045 614 A1, the disclosure of which is incorporated in full in this application.

Additionally, the support rod may also comprise at least two catch structures which permit vertical adjustment and locking of the support rod with respect to a second direction parallel to the central axis of the support rod in the opposite direction to the first direction. The catch structures, e.g. in the catch position in cooperation with a catch, prevent any movement of the support rod relative to the holding structure with respect to two opposed directions of movement, that is to say in the second direction and in the first direction. Alternatively, movement in one direction, e.g. upwards or in the first direction, is possible, while movement in the other direction is prevented.

The support rod is formed e.g. as an individual support rod or as a free end region of a support rod bow.

The invention relates, according to a second aspect, to a holding device for a headrest part comprising a holding structure which forms a guide for a support rod or a free end of a support rod bow and cooperates with a catch of a locking device which is held movably on the holding structure in such a way that it is movable into engagement and out of engagement with a catch structure of the support rod. If the catch is in engagement with the catch structure, the locking device is arranged in a catch position. If the catch is out of engagement with the catch structure, the locking device is in a release position.

The object of the invention was to provide a holding device which, e.g. in the case of a vehicle impact, prevents the unwanted movement of the support rod out of the holding structure.

This object was achieved by a holding device having the features the present invention.

The catch is e.g. formed substantially circular in cross-section.

The catch is formed e.g. of a metal or of plastics material.

Furthermore, the invention relates to a method for producing a support rod.

An object of the invention is to provide a method for producing a support rod.

This object is achieved by a method in which, upon impressing the base surface, a region of the support rod is embossed out, or removed with a milling cutter in such a way that a tongue with a free end region is formed. Between the tongue and a base surface there is formed an approximately U-shaped gap.

One configuration of the method consists in that prior to impressing the cutout a female die is introduced into an interior of the support rod, which female die forms a counter-surface for the impressing tool.

An example of embodiment of the invention is described by way of example in the following description of the figures, also with reference to the schematic drawings. In this case, for clarity—also insofar as different examples of embodiment are concerned—identical or comparable parts or elements or regions are designated with identical reference signs, sometimes with the addition of lowercase letters.

Features which are described, illustrated or disclosed only in relation to one example of embodiment may in the context of the invention also be provided in any other example of embodiment of the invention. Examples of embodiment which are thus altered—even if not shown in the drawings—are also covered by the invention.

All the disclosed features are per se essential to the invention. The disclosed content of the cited publications and of the described devices of the prior art is also hereby incorporated in full in the disclosure of the application, also for the purpose of jointly including individual or several features of the subject-matter disclosed therein in one or in several claims of the present application. Such altered examples of embodiment—even if not shown in the drawings—are also covered by the invention.

BRIEF DESCRIPTION OF THE DRAWING

FIG. 4 is a perspective view of the holding structure in which the support rod according to the invention is mounted, the locking device being in the catch position, FIG. 5 is a detailed illustration in accordance with detail A in FIG. 4.

DETAILED DESCRIPTION OF THE INVENTION

Figure 1:
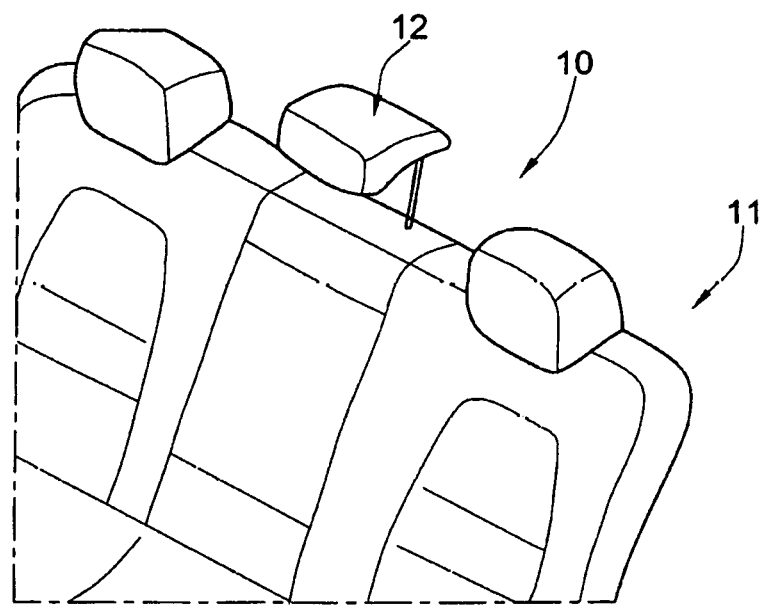
FIG. 1 is a perspective view of a rear seat of a vehicle.

FIG. 1 illustrates the rear seat 11 of a vehicle. The head restraint device according to the invention is designated by the reference numeral 10 in FIG. 1. The head restraint device 10 comprises the head restraint 12 illustrated in FIG. 2 and also two guide sleeves 13, one of these guide sleeves 13 being illustrated in FIG. 3.

The head restraint 12 comprises a headrest part 14 as well as two support rods 15. On the headrest part 14 there is formed a headrest surface 16 for the head of an occupant of the seat to rest against.

Figure 2:
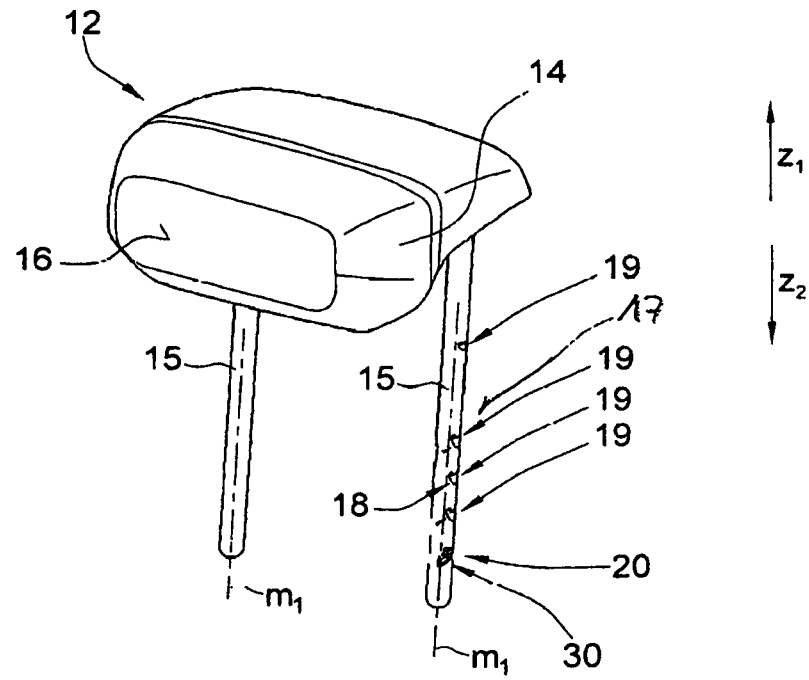
FIG. 2 is a perspective view of a head restraint with the support rod according to the invention.

As can be seen in FIG. 2, a plurality of catch structures 19 are formed on the right-hand support rod 15, which form a matrix 18 of a plurality of catch structures 19 and are part of a locking device 17. The catch structures 19 serve for detachably locking the head restraint 10 in different vertical positions.

The locking device 17 is movable between a catch position and a release position. Once the locking device 17 has been adjusted into the release position, the support rods 15 and with them the entire head restraint 12 can be moved in the directions z1 and z2 relative to the holding structure 13.

As soon as the locking device 17 is again in a catch position, a catch (not visible in FIG. 2) of the holding structure 13 can latch into one of the catch structures 19. In the present example of embodiment, the catch structures 19 are formed in such a way that owing to the cooperation of the catch with the catch structure 19 a movement in the direction z2 is prevented, while a movement in the direction z1 is possible within limits in the catch position as well. Alternatively, the catch structure 19 could however also be formed in such a way that in the catch position any movement of the support rod 15 relative to the guide structure in both directions z1 and z2 is prevented.

To prevent unwanted movement of the support rods 15 in the direction z1 in such a way that the support rods 15 can become detached from the holding structure 13, a detent structure 20 is formed on the support rod 15. The detent structure 20 is formed in accordance with the invention in such a way that the support rods 15 even upon twisting about a central axis m—such twisting not infrequently occurring in the event of accidents—cannot be released undesirably from engagement with the catch, which will be discussed further below.

Figure 3:
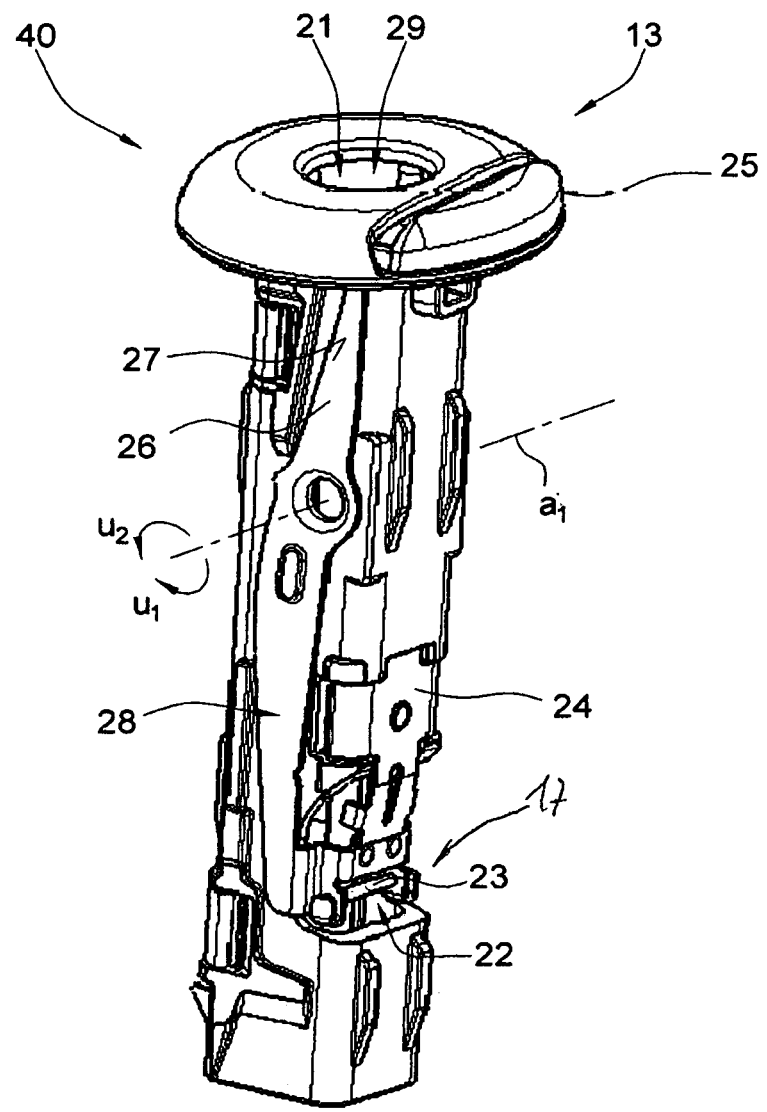
FIG. 3 is a perspective view of a guide structure for receiving a support rod.

FIG. 3 illustrates a holding device 40 which comprises the holding structure 13 and also a catch holder 26. The holding structure 13 is formed e.g. in a sleeve-like manner with a cutout 29 and has an introduction opening 21 for the support rod 15 and also a radial opening 22 through which a catch 23 movably mounted externally on the holding structure 13 can move into engagement with one of the catch structures 19 or the detent structure 20. The catch 23 is loaded in engagement with one of the catch structures 19 or with the detent structure 20 by a restoring element 24. By means of an actuation means 25, a user can move the catch 23 out of engagement with the support rod 15 and thus adjust the locking device 17 into the release position.

The catch 23 is fastened to a catch holder 26. It could alternatively also be produced in one piece therewith. The catch holder 26 is formed as a multi-arm lever comprises a first lever arm 27 which cooperates with the actuation means 25, and a second lever arm 28 on which the catch 23 is held. The catch holder 26 is held on the holding structure 13 pivotably about the pivot axis a1 and is loaded by the restoring element 24 in the pivoting direction u1, the catch 23 being loaded in engagement with one of the catch structures 19 or with the detent structure 20.

The locking device 17 can be adjusted into the release position by a force on the actuation means 25, in which release position the catch 23 is out of engagement with the catch structures 19 or the detent structure 20. It should however be mentioned that it is of secondary importance for the invention how the catch 23 is held and how it is moved into engagement with the support rod 15.

In FIGS. 4 and 5, the support rod 15 is accommodated in the cutout 29 of the holding structure 13. The locking device 17 is in the catch position. The catch 23 is in engagement with the detent structure 20. In particular in the enlarged view according to FIG. 5, it can be recognised that a tongue 30 of the detent structure 20 of the support rod 15 extends over the catch 23. The support rod 15 cannot be moved further in the direction z1 owing to the engagement of the catch 23 with the detent structure 20.

Figure 6:
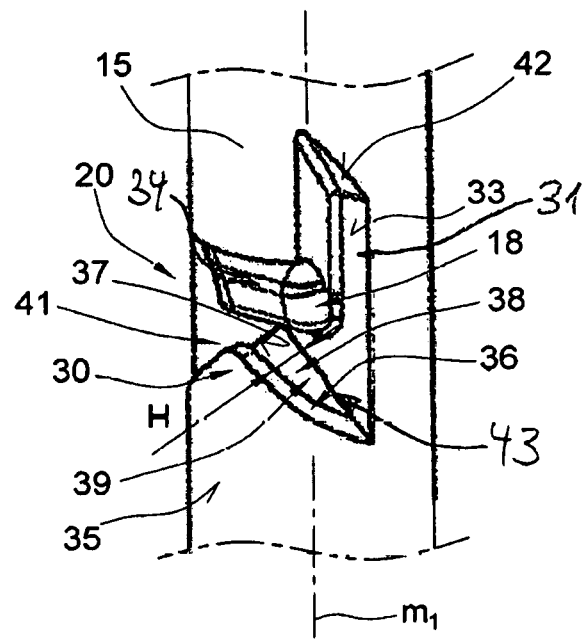
FIG. 6 is a perspective view of a region of the support rod according to the invention which has a detent cutout.

FIG. 6 shows a region of the support rod 15 with the detent structure 20. The detent structure 20 was produced by the outer surface 35 of the support rod 15 being pressed in by means of a pressing tool, not shown, in such a way that a base surface 33 is produced which extends in a plane arranged e.g. approximately parallel to the central axis m1. In this case, a region of the tongue 30 can be embossed out in such a way that a gap 43 is produced between the base surface 33 and the tongue 30. Alternatively, e.g. the wall surfaces formed by embossing the base surface 33 owing to the metallic material of the support rod 15 flowing between the levels of the outer surface 35 and the base surface 33, which thereafter are different, can later be removed, so that the U-shaped gap between the tongue 30 and the base surface 33 is produced and on the tongue 30 a free edge region 36 (see FIG. 6) and also radially within the tongue 30 an opening 38 with a reveal 37 can be formed, via which an interior 39 of the support rod 15 is radially accessible.

Figure 7:
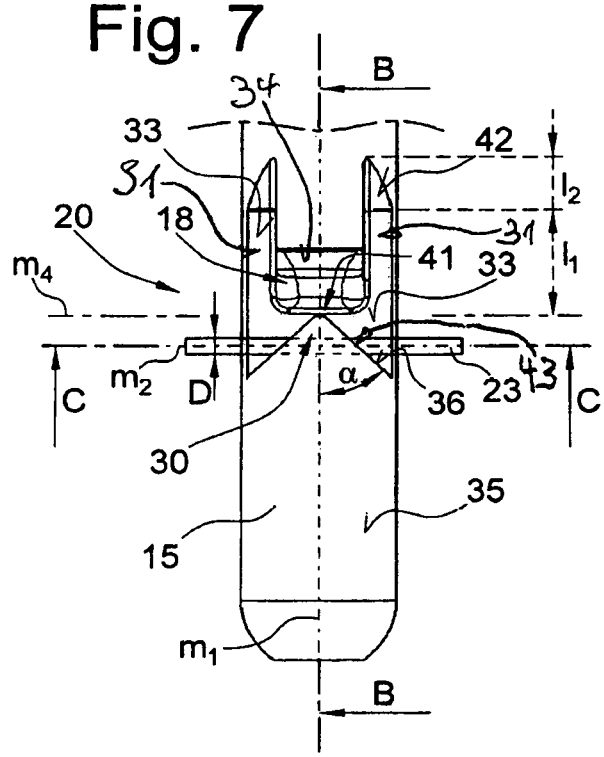
FIG. 7 is a top view of the detent cutout.

FIG. 7 illustrates the support rod 15 and the catch 23 without the holding structure 13. A height H between the base surface 33 and an inner surface 32 of the tongue 30 is greater than the diameter D of the catch 23. As a result, the catch 23 can move at least with a partial region of its cross-sectional surface between the base surface 33 and the inner surface 32, as can be seen in FIG. 7.

Figure 8:
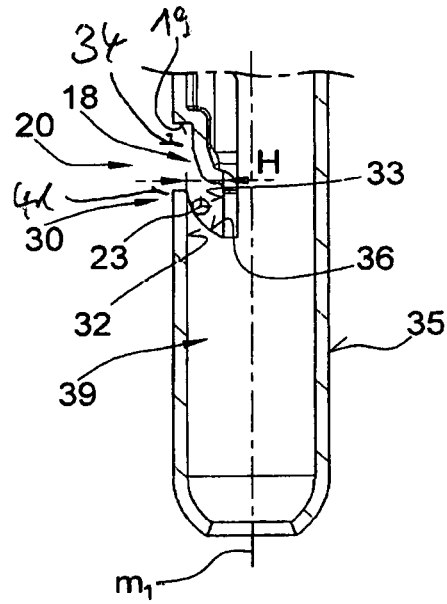
FIG. 8 is a sectional view along section line B-B in FIG. 7.

It can be seen in FIGS. 7 and 8 that the catch 23 can move deeply in the direction z2 into the cutout 29, the catch 23 being arranged radially within the tongue 30 (relative to the central axis m1).

It can likewise be seen in FIG. 7 that the edge surfaces 36 of the detent structure 20 form with the central axis m1 an angle α, which may be approximately between 30° and 65°, e.g. between 30° and 60°, in particular between 40° and 50° and in particular between 60° and 65°. As can be seen e.g. in FIG. 8, this results in the edge surfaces 36 extending in the direction z2 with respect to a free end region 41 of the tongue 30, and the catch 23 in this way being able to move relatively far beneath the detent structure 20. The base surface 33 is formed complementarily e.g. in the region of the cut-out tongue 30.

With respect to an imaginary axis m4 which runs at right-angles to the central axis m1, a slope structure 34 lies opposite the detent structure 20, which slope structure extends between the outer surface 35 and the base surface 33. The slope structure 18 extends across a longitudinal region l of the support rod 15 parallel to a central axis m1. The slope structure 34 drops from the level of the outer surface 35 of the support rod 15 across a longitudinal region l1 of the central axis m1 gradually to the level of the base surface 33. It prevents tearing of the material during the process of impressing by means of a pressing punch at an unwanted point. Furthermore, the catch 23 is guided by the slope structure 34 into engagement with the detent structure.

In the longitudinal region l1 of the slope structure 18 and furthermore in an additional longitudinal region l2, the base surface 33 extends on either side of the slope structure 18 parallel to the central axis m1. With an inclined surface 42, the level of the base surface 33 rises parallel to the central axis m1 to the level of the outer surface 35. Because of these lateral regions 31 of the base surface 33, the catch surface 19 is formed narrower. This prevents the risk of unwanted unlocking upon twisting of the support rod 15 about the longitudinal central axis m1.

Figure 9:
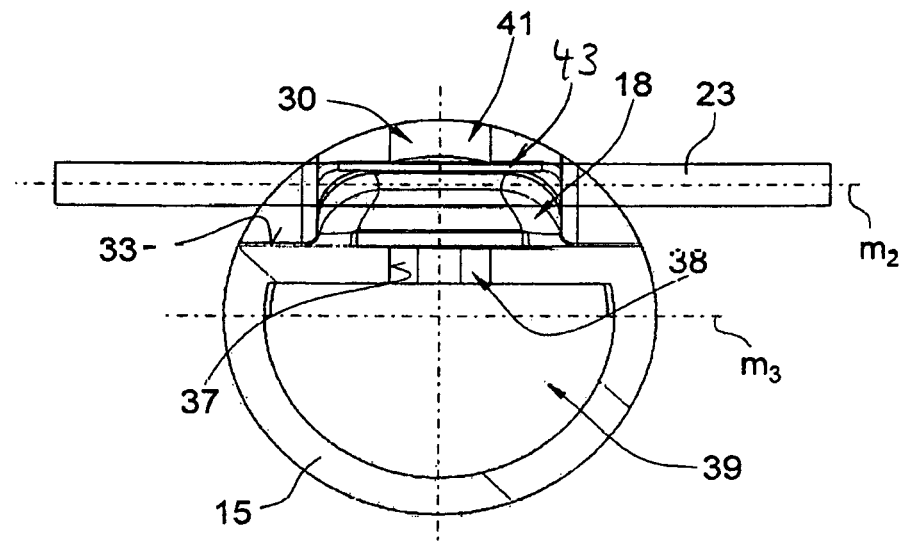
FIG. 9 is a sectional view along section line C-C in FIG. 7.

FIG. 9 shows a cross-section through the support rod 15 and the holding structure 13, the section having been taken through the catch 23. In FIG. 9, the support rod 15 is arranged in its desired position relative to the holding structure 13, in which position a central axis m2 of the catch 23 extends approximately parallel to the base surface 33 and to an axis m3 which likewise runs parallel to the axis m2. In FIG. 9 there can also be seen the opening 38 with the reveal 37, which is yielded owing to the cut-out detent structure 20.

Figure 10:
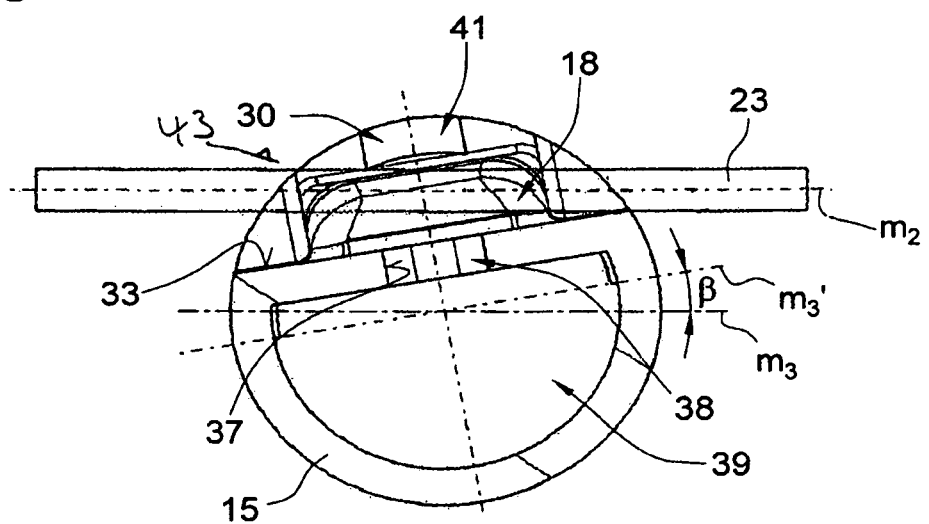
FIG. 10 is an illustration following FIG. 9, the support rod being twisted through 20° with respect to the central axis.

In FIG. 10, the support rod 15 is twisted about an angle β between the axis m3 and an axis m3' e.g. because of a vehicle accident. It can be seen that the catch 23 is nevertheless extended over by the detent structure 20, so that the support rod 15 is hampered in a radial movement in the direction r. The support rod 15 can therefore not be moved out of engagement with the holding structure 13 in the direction z1.

The invention claimed is:

1. A support rod for a head restraint of a vehicle seat, wherein the support rod is a tube having at least one structure that is part of a locking device and is intended for cooperating with a catch of the locking device, the catch being associated with a holding structure, wherein the structure of the tube comprises a base surface that prevents movement of the catch radially to a central axis of the support rod and comprises a catch surface that cooperates with the catch to prevent a movement of the support rod in at least a first direction, wherein at least one catch structure as a detent structure has a cut-out tongue with an inner surface that radially faces a central axis of the support rod, the cut-out tongue having a free end spaced apart from the base surface by a height so that at least a portion of the catch is movable radially under a region of the inner surface of the tongue.

2. The support rod according to claim 1, wherein the tongue extends parallel to the central axis.

3. The support rod according to claim 1, wherein the catch surface is formed by edge surfaces that extend between a free end region of the cut-out tongue and the base surface.

4. The support rod according to claim 3, wherein the two edge surfaces run towards one another and meet at the free end.

5. The support rod according to claim 4, wherein the edge surfaces form an angle with the central axis.

6. The support rod according to claim 1, wherein the detent structure lies opposite a catch structure formed to cooperate with the catch to prevent any movement of the support rod in a direction.

7. The support rod according to claim 6, further comprising a slope structure that lies opposite the detent structure in the longitudinal direction of the central axis, wherein the slope structure drops from an outer surface of the support rod in the direction across a longitudinal region on to the base surface.

8. The support rod according to claim 7, wherein the base surface laterally to the slope structure extends at least across a longitudinal region of the central axis.

9. The support rod according to claim 1, wherein the support rod is an individual support rod or a free end region of a support rod bracket.

10. A holding device for a headrest part, comprising: a support rod according to claim 1; a holding structure that forms a guide for the support rod or a free end of a support rod bracket; and a locking device that is held movably on the holding structure and has a catch, wherein the holding structure cooperates with and cooperates with the catch so that the locking device is movable into engagement and out of engagement with a cutout of the support rod.

11. The holding device according to claim 10, wherein the catch has a substantially circular cross-section.

12. A method for producing a support rod with a detent structure according to claim 1, comprising the steps of: pressing a region of an outer surface of the support rod at approximately right-angles to a central axis of the support rod using a punch; and removing a flank surface produced because of the pressing so that a free tongue is formed with a free and that extends in a direction parallel to the central axis.

13. The method according to claim 12, further comprising introducing a female die into an interior of the support rod prior to pressing the outer surface of the support rod, wherein the female die forms a counter-surface for the punch.

* * * * *